Figure 3:
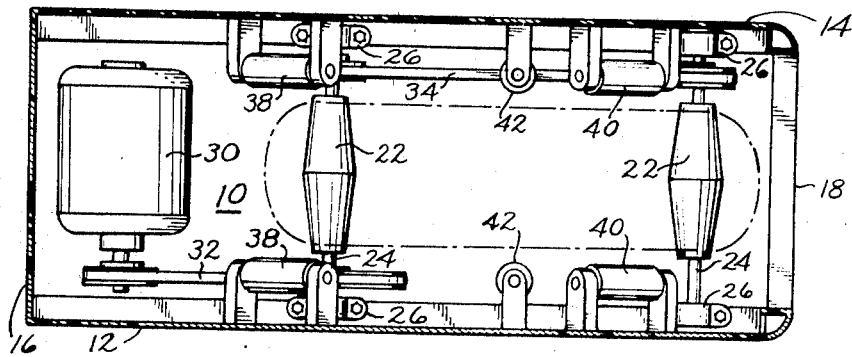

United States Patent

Hall et al.

[15] 3,635,610
[45] Jan. 18, 1972

[54] TIRE CONDITIONING APPARATUS

[72] Inventors: Walter Dennis Hall; Malcolm Jean Charles, both of Lodi, Calif.

[73] Assignee: Super Mold Corporation

[22] Filed: Dec. 3, 1969

[21] Appl. No.: 881,841

[52] U.S. Cl. ..............425/11, 157/13, 264/36, 264/94, 425/170, 425/367, 425/446
[51] Int. Cl. .............................B29h 3/00, B29h 21/00
[58] Field of Search.............18/1 R, DIG. 41; 157/13; 264/36, 94; 144/288

[56] References Cited

UNITED STATES PATENTS

| | | | |
|---|---|---|---|
| 2,649,665 | 8/1953 | Anderson et al. | 157/13 X |
| 3,389,193 | 6/1968 | Hughes | 264/36 |
| 3,480,068 | 11/1969 | Reid et al. | 157/13 |
| 3,495,296 | 2/1970 | Ericson et al. | 264/94 X |
| 3,529,048 | 9/1970 | Kovac et al. | 264/94 |

Primary Examiner—Robert L. Spicer, Jr.
Attorney—Eugene D. Farley

[57] ABSTRACT

Tire conditioning apparatus is provided for removing flat spots and other surface irregularities from tires preliminary to recapping or truing them. The apparatus comprises a frame, drive rolls mounted in the bottom of the frame for supporting and rotating the tire, pressure assembly arranged to press the tire against the drive rolls with a predetermined amount of pressure, and heating means located a spaced distance from the tire for heating it as it is rotated under pressure. This removes the stresses and permits the tire to assume its normal shape.

9 Claims, 3 Drawing Figures

PATENTED JAN 18 1972

3,635,610

Walter Dennis Hall
Malcolm Jean Charles
INVENTORS

BY

Eugene D. Farley

Atty.

TIRE CONDITIONING APPARATUS

This invention relates to tire conditioning apparatus. It pertains particularly to apparatus for returning tires to their normal shape and condition preliminary to recapping them and truing them.

Under certain conditions, pneumatic tires develop stresses which appreciably deform them.

In the manufacture of new tires, varying rates of cure applied after initial curing in the mold induces tresses that are gradually relieved over a period of several months use of the tire.

In use, tires are subject to a condition known as "Nylon Set." This is the result of stresses set up in the tire by the weight of the vehicle when the latter is at rest.

Similar stresses are induced in tires stored in stacks or random piles, by the weight of the superimposed tires pressing against the tires at the bottom.

The inevitable result of these various stress-producing conditions is to deform the tire, causing irregularities and flat spots. The presence of such irregularities is of the greatest importance when recapping or truing the tire. If a low spot is present in the tire about to be recapped, it is not eliminated by the steps of buffing and tread building. It appears as a high spot after the tire is put to use.

When truing a tire, high spots must be removed prior to the balancing operation. This normally is accomplished by trimming off the excess rubber. However, if the excess rubber is in the form of a lump or high spot caused by displacement of the rubber, grinding off the excess uniformly about the periphery of the tire obviously will remove unnecessarily a great deal of useful tread.

Accordingly it is the general purpose of the present invention to provide apparatus for conditioning tires preliminary to recapping and truing them.

It is another purpose of the present invention to provide such apparatus which will accomplish its desired function rapidly and universally on tires of various sizes, weights and condition.

It is still a further object of the present invention to provide tire conditioning apparatus which, although it rotates the tire at a high rate of speed is of relatively simple construction, easily controlled, and free of vibration.

Still a further object of the invention is the provision of tire conditioning apparatus involving the application to the tire of heat and pressure under carefully controlled and coordinated conditions.

Figure 1:
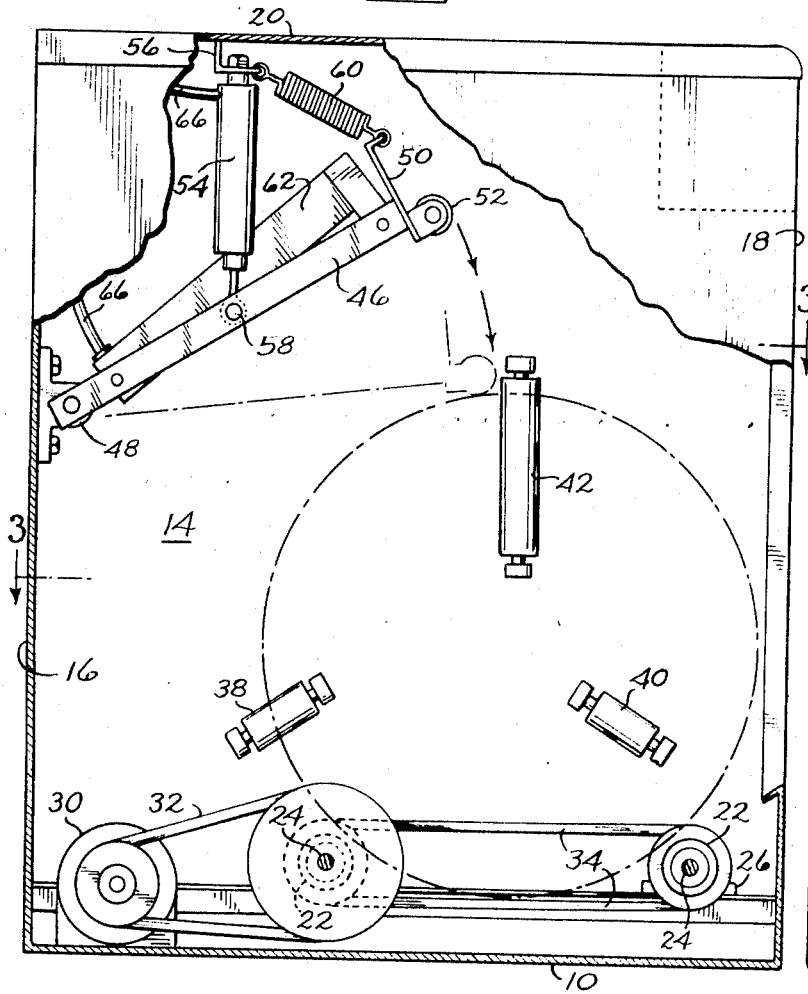

The manner in which the foregoing and other objects of this invention are accomplished will be apparent from the accompanying specification and claims considered together with the drawings, wherein:

FIG. 1 is a view in side elevation, and

Figure 2:
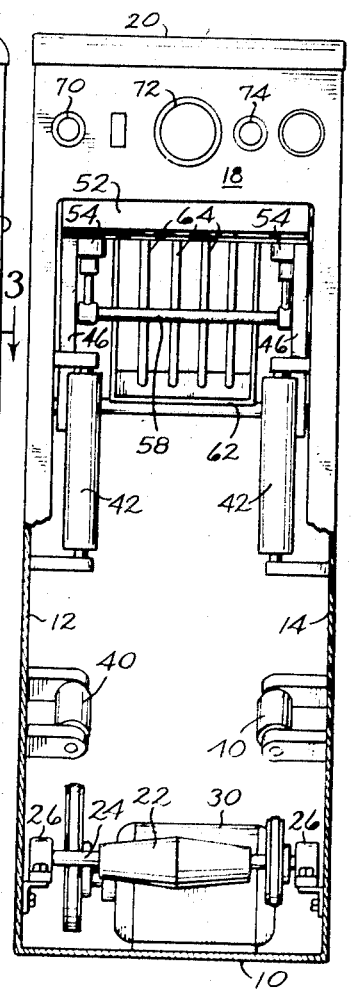

FIG. 2 in front elevation of the presently described tire conditioning apparatus, both views being partly broken away to reveal interior construction; and FIG. 3 is a sectional view taken along line 3—3 of FIG. 1.

The tire conditioning apparatus of this invention is housed in an exterior frame which to advantage may assume the configuration of a cabinet sized to receive the tire edgewise in an upright position.

The frame thus includes a bottom 10, a pair of sidewalls 12, 14, a backwall 16, a partial front wall 18, and a top 20. Sidewalls 12 and 14 with partial front wall 18 define an opening or doorway through which the tire is introduced into the interior of the apparatus.

Within the apparatus are appropriately disposed means for driving the tire at a high rotational speed, for guiding it, for applying flexing pressure to it, and for heating it while it is being flexed, together with means for controlling the degree of pressure and heat application at the optimum levels.

To this end there are mounted on floor 10 of the unit a pair of spaced drive rolls 22. Each of these is fixed to a shaft 24 which is journaled in bearings 26 secured to the opposite sidewalls of the frame.

Preferably, drive rolls 22 assume the configuration of a pair of frustoconical members arranged base to base. This provides a central ridge and outwardly tapered peripheral areas which have an important function. As the flexed tire rotates rapidly on the rolls, it is centered automatically by the peaked or ridged configuration of the latter so that vibration and wandering of the tire are minimized, or even completely eliminated.

Drive rolls 22 are spaced from each other a sufficient distance to support a tire upright, on edge, in a freely rotatably position. Both rolls are driven synchronously by a drive which includes electric motor 30, belt 32 engaging a pulley on the shaft 24 of one of drive rolls 22, and a belt 34 interconnecting pulleys on the shafts 24 of both of drive rolls 22. The drive thus provided rotates the tire rapidly, for example at speeds equivalent to 20 miles per hour.

Guide means are provided for guiding the tire as it rapidly rotates, insuring that the tire remains upright and centrally oriented within the frame.

In the illustrated form of the invention the guide means comprise three pairs of guide rolls 38, 40, 42. These are journaled in arms mounted on the respective sidewalls of the frame. They are disposed radially with respect to the tire and are arranged at suitable angles to each other, for example, in an angular relationship of 120° where there are three guide roll pairs. However, more or fewer of the guide roll pairs may be employed if desirable or necessary.

As the tire rotates on the drive rolls, it is pressed by a pressure roll assembly which has for its function flexing the tire and kneading it, thereby assisting in returning it to its original undeformed condition.

The pressure roll assembly employed for this purpose includes a pair of parallel arms 46. The inner ends of the arms are pivotally mounted on brackets 48. The outer ends of the arms support between them a crosspiece 50. A pressure roll 52 is journaled in bearings supported by the cross piece. This important member of the apparatus may be made of any hard, durable material, preferably smooth-surfaced steel.

Drive means are provided for reciprocating the press roll 52 between a retracted position, wherein it is out of engagement with the tire, and an advanced position where it engages the same, these being the full-line and dotted-line positions, respectively, of FIG. 1.

In the illustrated form of the invention, the drive means employed for this purpose comprise a pair of fluid-operated cylinders, preferably pneumatic cylinders 54. The cylinders are single acting, being driven in the advancing or downward direction.

The case of each cylinder is bolted to a bracket 56 suspended from the top 20 of the frame. The piston rod of the cylinder pivotally engages a crossbar 58 which extends between arms 46.

Retraction of pressure roll 52 is accomplished through the agency of a coil spring 60 which interconnects a frame member such as bracket 56 and an extension of crosspiece 50.

Accordingly pressure roll 52 may be advanced into pressure contact with the periphery of the tire by the advancement of the piston rod of cylinder 54. It is maintained in this position as long as pressure application to the tire is desired. Then upon release of the drive of the cylinder, spring 60 returns the pressure roll to its retracted station.

Heating means are included in the apparatus for the purpose of softening the rubber tire to make it more susceptible to the kneading action of pressure roll 52.

To this end an open frame 62 is supported on arms 46. Frame 62 mounts a plurality of electric heating elements 64 which are supplied with electric current through a lead wire 66.

It is to be noted that frame 62 is spaced slightly from arms 46, in the direction away from the tire. The purpose of this arrangement is to space the heating element an optimum distance from the tire when the pressure roll is in its operative position, thus insuring that the tire is heated sufficiently to be rendered somewhat plastic without being overheated.

In the operation of the device, a tire is loaded through the front opening onto drive rolls 22. Drive motor 30 is started. This rotates the tire at a predetermined rotational speed.

Electric heating elements 64 are activated and cylinder 54 advanced to place pressure roll 52 in contact with the peripheral surface of the tire.

The heating elements soften the rubber while the pressure roll kneads it as required to work out any flat spots or surface irregularities. The desired result is achieved rapidly, an operating cycle of from 4 to 5 minutes usually being sufficient.

It is evident that tires of various size, condition and composition vary materially in the resistance they offer to pressure roll 52. Sufficient pressure must be applied by this roll to work the rubber. Accordingly, it is desirable to provide means for adjusting the pressure of the roll to correspond to the resistance offered by the tire.

This problem is solved in the present invention by taking advantage of the fact that the power requirements of the drive motor 30 also are related to the tire characteristics. Accordingly, by placing an ammeter in series circuit relation with the motor, the drive motor amperage may be utilized as a measure of the rolling resistance of the particular tire which is in the machine. The load on the pressure roll is then adjusted so that the motor develops a constant maximum ammeter reading, which is the optimum pressure value.

Thus in the front partial panel 18 of the frame, there may be provided a group of instruments which appropriately accomplish these functions. 70 Indicates an on-off cycling switch which initiates the automatic cycle. It starts drive motor 30, energizes heating element 64 and advances cylinder 54. 72 Indicates an ammeter which is in series circuit relation with the drive motor. 74 Indicates a valve control for controlling the fluid pressure exerted by cylinder 54.

Accordingly, after initiating the cycle of operation by pushing button 70, the operator watches ammeter 72 and adjusts air pressure regulator valve 74 until the desired ammeter reading is obtained. The unit then runs automatically until the cycle is completed.

Having thus described my invention in preferred embodiments, I claim as new and desire to protect by letters patent:

1. Tire conditioning apparatus comprising:
   a. an exterior frame dimensioned to receive a tire edgewise,
   b. drive roll means mounted across the bottom of the frame for supporting the tire in an upright, freely rotatable position and for rotating the tire at a predetermined rotational speed,
   c. pressure roll means mounted on the frame above the tire,
   d. pressure roll drive means connected to the pressure roll for reciprocating it between an advanced operating position where it exerts a predetermined pressure against the tire, pressing it against the drive rolls and a retracted loading position remote from the tire, and
   e. tire heating means positioned for heating the tire to a predetermined temperature as it rotates under pressure.

2. The tire conditioning apparatus of claim 1 including tire guide means mounted along the sidewalls of the frame for maintaining the tire in an upright position as it rotates.

3. The tire conditioning apparatus of claim 1 wherein the drive roll means includes a pair of spaced drive rolls, each having a central, annular ridge and outwardly tapered peripheral surfaces for self-centering the tire as it rotates thereon.

4. The tire conditioning apparatus of claim 1 wherein the pressure roll means comprises a pair of arms extending from the rear wall of the frame in the direction of the tire, pivotal mounting means mounting the outer end of the arms to the rear wall, and a pressure roll journaled between the inner ends of the arms.

5. The apparatus of claim 4 wherein the tire heating means is mounted on the arms a spaced distance therefrom in the direction away from the tire, thereby spacing the heating means from the tire when the pressure roll is in contact with the same.

6. The apparatus of claim 4 wherein the pressure roll drive means comprises a double-acting, fluid-operated cylinder.

7. The apparatus of claim 4 wherein the pressure roll drive means comprises a single-acting, fluid-operated cylinder operative to drive the pressure roll means to its advanced position against the tire, and spring means coupled to the pressure roll means for returning the pressure roll means to its retracted position upon inactivation of the cylinder.

8. The apparatus of claim 1 wherein the tire heating means comprises electric heating means and an electric circuit including the same.

9. The tire conditioning apparatus of claim 1 wherein the drive roll means comprises at least one drive roll coupled to an electric motor in an electric circuit with an ammeter and the pressure roll drive means includes control means for adjusting the pressure developed thereby, the control means being adjustable to adjust the pressure to an optimum level indicated by the ammeter reading.

* * * * *